April 18, 1939.　　　　B. CYR　　　　2,155,358

FLUID FLOW REGULATOR

Filed Jan. 8, 1936

Inventor
Benjamin Cyr
George H Fisher
Attorney

Patented Apr. 18, 1939

2,155,358

UNITED STATES PATENT OFFICE 2,155,358

FLUID FLOW REGULATOR

Benjamin Cyr, Minneapolis, Minn., assignor to Minneapolis-Honeywell Regulator Company, Minneapolis, Minn., a corporation of Delaware Application January 8, 1936, Serial No. 58,085

7 Claims. (Cl. 137—139)

My invention relates to a fluid flow regulator and more particularly to a device of this type which is normally operated automatically but in which provision is made for operating the same manually when desired.

Where a valve is controlled automatically it is often highly desirable that some provision be made for operating the same manually. Moreover, due to the fact that an operator is inclined to forget to place the valve back under automatic control, it is desirable that some means be provided for automatically restoring the valve to automatic control. The need for this becomes of particular importance in the case of a power failure wherein it is necessary to manually operate the valve to open position and to leave it in said position pending the restoration of the power. In such a case it is very unlikely that the operator will release the manual control upon resumption of the power with the result that there is a danger of the condition controlled by the valve attaining an excessive value.

An object of the present invention is to provide a manual operating means for a valve wherein a portion of said operating means is located within the valve casing and wherein a new and novel means is provided for sealing the casing against the escape of fluid at the point at which the operating member enters the casing.

A further object of the present invention is to provide a power operated valve in which a portion of the power operated valve actuating mechanism is located in fluid communication with the valve and in which manual means is provided for operating said valve, which means comprises a portion cooperating with said portion of the power operated actuating mechanism, and in which means are provided for sealing said manually operated means without hindering the free operation thereof.

A further object of the present invention is to provide a manually operated valve actuating mechanism extending within the valve casing and having a yieldable means associated therewith which functions both to seal the casing against the escape of fluid and to urge said manually operated means to a valve closed position.

A further object of the present invention is to provide a thermostatically controlled solenoid valve wherein manually operated means is provided for actuating said valve in the event of power failure, and in which further means is provided to automatically restore the valve to the control of the thermostat upon the resumption of power.

Figure 1:
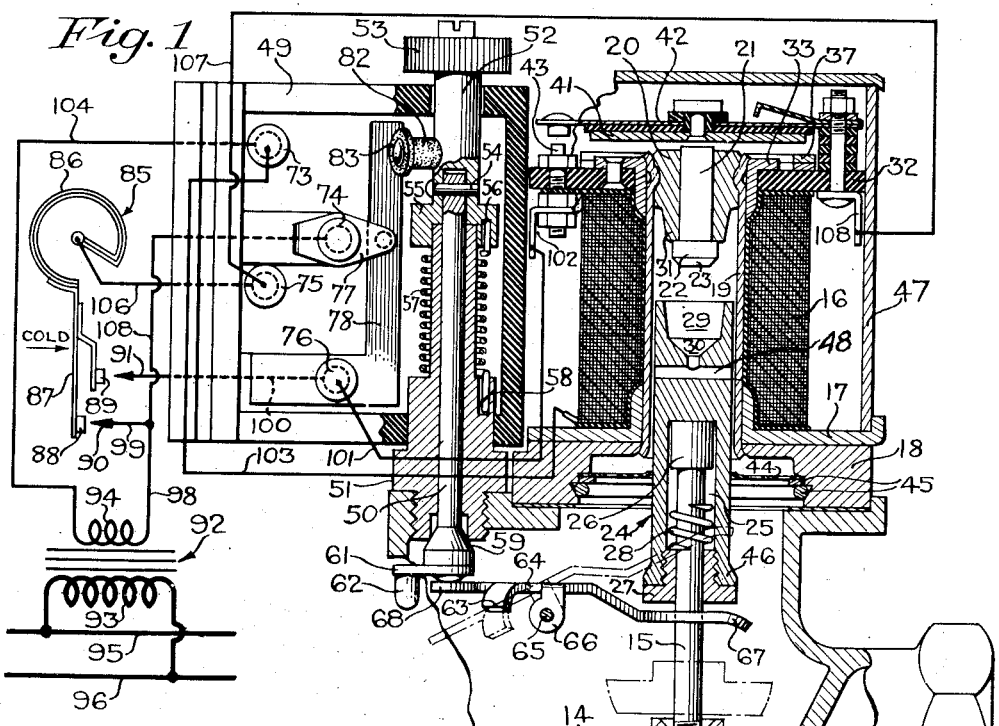
Figure 5:
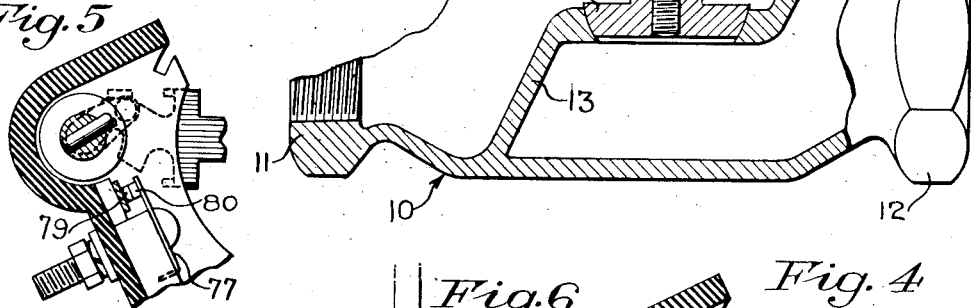
Figures 2, 3, 4, 6:
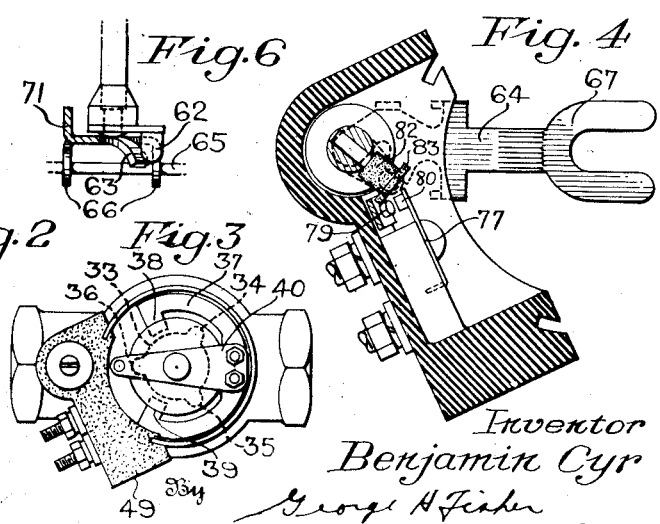

Other objects of the invention will be apparent from a consideration of the accompanying specification, claims and drawing, of which Figure 1 is a schematic view of my improved fluid flow regulator with the valve shown in section with portions broken away and with the terminal box thereof rotated about the axis of the manually operated valve actuator, Figure 2 is a front elevational view of my improved valve, Figure 3 is a top plan view of my valve with the cover removed, Figure 4 is a sectional view of a portion thereof taken along the line 4—4 of Figure 2 in the direction of the arrows with the parts shown in valve-closed position, Figure 5 is a fragmentary showing of the same portion as shown in Figure 4 but with the parts shown in their valve-open position and in which Figure 6 is a detail view of a portion of the manually operated valve actuating means.

Referring to Figure 1, a valve body is designated by the reference numeral 10 and comprises an inlet connection 11 and an outlet connection 12. The valve body is provided with the usual transverse partition 13 which is apertured to provide a valve seat therein. Cooperating with said valve seat is a valve 14 which is rigidly secured to a valve stem 15 by suitable means such as being threaded thereto. Mounted on the valve body 10 is a solenoid valve actuator.

This solenoid actuator comprises a coil 16 located on a flanged disc 17 of magnetic material, which disc in turn is located upon a relatively thick circular plate 18. The latter plate 18 is supported by the valve housing 10 and is secured thereto in fluid tight relation. Extending within the coil 16 is a sleeve 19 of suitable non-magnetic conducting material such as brass. Secured within the upper end of the sleeve 19 is a sleeve 20 which is also of non-magnetic conducting material and may likewise be formed of brass. The sleeve 20 is secured to the sleeve 19 by any suitable means to insure a fluid tight joint. Extending through the sleeve 20 is a pin 21 which is of magnetic material. This pin terminates in a head 22 which head is provided with a conical extremity 23.

A core of magnetic material 24 is loosely mounted within the sleeve 19 and is designed to be actuated by energization of coil 16. This core is connected to the valve stem 15 through a lost motion connection. This connection is accomplished by providing the core 24 with an elongated cylindrical passage 25 in which is slidably located a cylindrical head 26 of valve stem 15. The lower end of the passage 25 is closed by means of a plug 27. Mounted upon this plug is a spring 28 which spring serves to prevent the head 26 of valve stem 15 from being jarred excessively on energization of the solenoid. It will be seen that by reason of the lost motion connection between the core 24 and the valve stem 15 a hammer action is obtained which insures against sticking of the valve to its seat and further insures the firm seating of the valve upon deenergization of the solenoid.

The upper end of the solenoid core 24 is provided with a recess having two conical surfaces 29 and 30. The conical surface 30 is adapted to engage the conical surface 23 of pin 21 to limit the upper movement of the core. The conical surface 29 is adapted to cooperate with a similar conical surface 31 on member 20 in such a manner that the core is guided into engagement with stop 23. In order to guard against any dash pot action a transverse passage 48 is provided in the core 24 which passage in the communication with a recess in the upper end of the core. This is necessary because of the presence of the fluid within the space between the core and the sleeve 20. In this connection, attention is called to the fact that the core is loosely mounted within the sleeve 19 so as to permit fluid to flow around the same. This is of considerable importance inasmuch as it serves to cool the windings of the coil 16 to prevent excessive heating thereof during prolonged operation.

On top of the coil 16 there is located a disc 32 of insulating material. Secured to said disc is a flanged circular plate 33 of magnetic material. As most clearly shown in dotted lines in Figure 3, this plate is provided with three equally spaced outwardly extending projections 34, 35 and 36. Also located on said insulating plate is a second plate 37 of magnetic material. This plate as most clearly shown in Figure 3, is in the form of an incomplete annulus and is provided with three inwardly extending prongs 38, 39 and 40, which are equally spaced from the prongs 34, 35 and 36 of plate 33. A circular armature 41 is secured to a switch blade 42 which switch blade is adapted to cooperate with a stationary contact 43 located upon the insulating disc 32. As will be apparent from Figure 3, the armature 41 serves to complete the magnetic path between magnetic members 33 and 37 upon the energization of the coil. By reason of the projections 34, 35 and 36 on plate 33 and the projections 38, 39 and 40 on plate 37, the armature will be attracted most strongly adjacent these projections. This will result in a three-point holding action between each plate and the armature which will lessen the danger of the armature being held unevenly so as to cause chattering or vibration thereof. By reason of the resilience between switch blade 42 to which the armature 41 is attached, the latter member is held in the position indicated in the drawing when the coil is deenergized.

The disc 18 is provided with a cylindrical recess in the interior thereof in which is secured a resilient spring disc 44. This spring disc is secured in place by means of a plurality of rings 45. It will be noted that the inner edge of the spring disc 44 is turned upwardly. This upwardly turned portion is designed to cooperate with a conical shoulder 46 at the lower end of the core 24.

It will be noted that two possible magnetic paths are provided for the flow of flux upon energization of the coil. One of these paths is through the disc 17, the casing 47, which is of magnetic material, the plate 37, the armature 41, the plate 33 and the core 24. The other of these paths is through disc 17, casing 47, plate 37, armature 41, pin 21 and the core 24. Flux flowing through the first mentioned of these two paths is not shaded, while the flux flowing through the second mentioned of these two paths is shaded by reason of the effect of the non-magnetic conducting sleeve which acts as a shading ring. The result is that the flux flowing through these two paths is displaced approximately 90 degrees. This produces a much smoother action of both the core and the armature 41 and eliminates much of the vibration which is usually present if the device is operated by alternating current.

The spring disc 44 by reason of such engagement of its inner turned edge with the shoulder 46 upon energization of the coil serves further to center the core within the sleeve 19 and at the same time to yieldably urge the core downwardly so that upon deenergization of the coil, the spring disc functions as a means for returning the core to its deenergized position in spite of any residual magnetism which would otherwise tend to retain the core in its energized position.

For a more complete description of the structure and operation of this portion of my valve, reference is made to the applications of Willis H. Gille, Serial No. 740,547, filed August 20, 1934, and now Patent No. 2,114,961, granted April 19, 1938, and Serial No. 39,701, filed September 9, 1935.

I will now describe the manually operated actuating means. As previously stated in the brief description of the drawing, the terminal box of my valve is shown as rotated about the axis of the manual operator. This terminal box, which is designated by the reference numeral 49, is shown in its normal position with reference to the valve in Figures 2 and 3. As best shown in Figure 4, the terminal box is in the form of a hollow block. As will be apparent from a comparison of these figures with Figure 1, a sufficient portion of the switch box 49 is broken away in Figure 1 to permit the rotation of the switch box about a shaft 50 of the manual operator. The shaft 50 is journaled in a stud 51 which is threaded into the valve body 10. Connected to the shaft 50 is a cylindrical member 52 which has secured at its upper end a knurled knob 53 designed to be manually rotated by the operator. The shaft 50 and the cylindrical member 52 are secured together by means of a rivet 54, although it is to be understood that any other suitable securing means can be employed, and if desired, these two members can be integrally formed. The cylindrical member 52 is enlarged at its lower extremity as indicated at 55. This enlarged portion 55 is provided with an opening 56 on its under side into which extends one terminal of a spring 57. The other terminal of the spring extends into an opening 58 in the upper portion of stud 51. The spring 57 is normally tensioned so as to tend to move member 52 and the attached shaft 50 unwardly, and at the same time to rotate it in a clockwise direction, looking downwardly. As is apparent from the drawing, the shaft 50 is provided at its lower end with a conical shoulder 59 and by reason of the tendency of spring 57 to urge shaft 50 upwardly, this conical head is yieldably urged into engagement with the edge of an opening in the under side of stud 51.

The shaft 50 has attached at its lower end an arm 61. Secured to the arm 61 is a downwardly extending pin 62. This pin 62 is adapted to cooperate with a curved surface 63 of a core actuating member 64. The core actuating member 64 is pivotally mounted on a pin 65 through a pair of ears 66 as shown most clearly in Figure 6. The member 64 is provided at one end with a downwardly extending portion which terminates in a fork 67, as most clearly indicated in Figures 1 and 4. This fork straddles the valve stem and is adapted upon the member 64 being turned around the pivot 65 to engage the lower end of the core 24. The other end of member 64 consists of a flat strip which is normally horizontally disposed and which terminates in the portion 68 normally resting against the end of shaft 50. As indicated most clearly in Figure 6, the curved member 63 connects with the flat portion of the strip. With the parts in their normal position, the arm 61 is in a position where further rotation of shaft 50 in a counter-clockwise direction causes pin 62 to ride on the curved surface 63. This position of arm 61 with respect to the member 64 is shown most clearly in Figures 4 and 6. When it is desired to manually operate the valve, the shaft 50 is rotated in a counter-clockwise direction by means of the knurled knob 53 so that the pin 62 is caused to engage the curved surface 63 and to tilt the member 64 about the pivot 65. This causes the core 24 to be moved upwardly and the valve to be opened. The rotation of shaft 50 is stopped by the pin 62 engaging an upturned flange 71 of member 64. In this position, the pin 62 is engaging the flat portion of strip 64 and by reason of the weight of the core 24 resting on the fork 67, the shaft 50 is held in that position against the action of spring 57, which, as previously stated, tends to rotate the shaft in a clockwise direction. This position of shaft 50 and pin 62 with respect to member 64 is best shown in Figure 5, wherein these parts are shown in dotted lines. This tendency of the weight of the core to hold the shaft 50 in position is increased by reason of the fact that in order for the shaft to be rotated back, pin 62 must travel over a circular path, a portion of which is closer to pivot 65 than the position occupied when against flange 71. Since the pin travels through a horizontal path, it is accordingly necessary for the pin to press down the left hand portion of lever 64 and accordingly raise the core, still further in order to traverse this circular path. The effect is that the pin is frictionally held at the bottom of an inclined surface, over which it must travel to return to normal position.

While the rotation of shaft 50 causes the core 24 to be raised sufficiently to move the valve to open position, the core is not raised as far as it is by reason of energization of coil 16. Accordingly, if coil 16 is energized at the time that the shaft 50 is manually moved, or if it is subsequently energized, the frictional engagement of member 64 with pin 62 will not be present and, consequently, the spring 57 will be effective to rotate shaft 50 to a position it is in when the valve is closed, in which position the member 64 in no way interferes with the normal function of the valve.

Secured to the terminal box 49 are a plurality of terminals 73, 74, 75 and 76. These terminals are of a conventional form and any further description is deemed unnecessary. Secured to the terminal 74 within the terminal box 49 is a contact carrying arm 77, which arm is indicated most clearly in Figures 1, 4 and 5. Secured to the terminal 76 also within the terminal box 49 is a resilient switch blade 78 which carries a contact 79 adapted to be moved into engagement with a contact 80 carried by the contact carrying arm 77. As previously stated, the blade 78 is resilient and by reason of such resiliency tends to move in a direction such as to cause engagement of contacts 79 and 80. When the valve actuating member is in its normal position, this tendency of blade 78 to effect the engagement of the contacts 79 and 80 is resisted by a stud 82 secured to the member 52 and having attached thereto a circular disc 83 which bears against the switch blade 78. This action of the disc 83 is indicated in Figure 4, wherein the contacts 79 and 80 are shown as held in a separated position by reason of disc 83 engaging switch blade 78. Upon rotation of member 52 to open the valve manually disc 83 is rotated away from the switch blade 78 permitting the same to cause engagement of contacts 79 and 80 as indicated in Figure 5.

In Figure 1, I have shown a condition responsive switch and connections between the same and the valve whereby the operation of the valve is normally controlled by the thermostat. The thermostat is indicated generally by the reference numeral 85 and comprises a bimetallic element 86 to which is attached the contact arm 87. The contact arm 87 carries contacts 88 and 89 which are adapted to be engaged with stationary contacts 90 and 91, respectively. Contacts 88 and 90 are less widely spaced than contacts 89 and 91 so that upon movement of contact arm 87 in the direction of contact 91, the engagement of contacts 88 and 90 will be effected before the engagement of contacts 89 and 91. As indicated by the legend on the drawing, the bimetallic element 86 is of such character that contact arm 87 is moved in the direction of contacts 90 and 91 upon a decrease in temperature.

A step-down transformer 92 supplies power for the operation of the valve. This transformer comprises a line voltage primary 93 and a low voltage secondary 94. The primary 93 is connected to line wires 95 and 96.

The valve may be employed to regulate the flow of gas or other fuel to a fluid fuel burner to heat a room or other space. In such case the thermostat 85 is located in the space to be heated. As shown in the drawing, the thermostat is in the position which it assumes when the temperature of the room is above the desired value. Upon the temperature falling, the bimetallic element 86 will cause contact arm 87 to be moved to the right bringing into engagement contacts 88 and 90. The engagement of these contacts, however, does not establish any circuit, but if the temperature continues to fall contacts 89 and 91 will be brought into engagement whereby the following energizing circuit for the solenoid coil 16 will be established: From the right-hand terminal of secondary 94, through conductor 98, conductor 99, contact 90, contact 88, contact arm 87, contacts 89 and 91, conductor 100, terminal post 76, conductor 101, terminal 102, solenoid coil 16, conductor 103, terminal 73, and conductor 104 to the left hand terminal of secondary 94. This will cause the energization of coil 16 and almost immediately the armature 41 will be drawn down in the direction of engagement with magnetic members 33 and 37 causing the switch blade 42 to be engaged with the contact 43. Upon this taking place, the following holding circuit for relay coil 16 is established: From the right hand side of secondary 94, through conductors 98 and 99, contacts 90 and 88, contact arm 87, bimetallic element 86, conductor 106, terminal 75, conductor 107, terminal 108, switch arm 42, contact 43, solenoid coil 16, conductor 103, terminal 73 and conductor 104 to the left hand side of secondary 94. It will be noted that this new holding circuit is independent of the engagement of contacts 89 and 91 so that if the temperature should rise very slightly so as to cause disengagement of contacts 89 and 91, the solenoid coil will not be deenergized. In this manner, any slight vibration or chattering of the contact arm 87 will not cause sudden opening and closing of the valve.

Upon the energization of coil 16, core 24 will be moved upwardly and will, after a short period of time, cause the spring 28 to engage the head 26 of the valve stem 15 and will raise the valve from its seat. Due to the fact that the core is allowed to travel a considerable distance before the spring 28 engages the head of the valve stem, the stem will be given a sudden pull which will be more effective in moving the valve from its seat in the event that it is stuck thereto. The core 24 will continue to move upwardly until the conical surface 30 engages the head 23 of pin 21. In this position of the core, the shoulder 46 will engage the inturned edge of spring disc 44 in such a manner that the spring 44 will exert a slight tension on the core tending to pull it away from engagement with pin 23. As long as the coil is energized this tendency is resisted by the holding action of the coil but, as previously indicated, is effective to cause downward movement of the core upon deenergization of the coil 16. As previously indicated, the flux which is effective on the core flows through two paths, one of which is shaded and the other of which is not. In this manner, a more uniform holding action is secured and chattering is avoided. When the temperature rises sufficiently so that contacts 88 and 90 of the thermostat are disengaged, the coil 16 will be deenergized and due to the combined effects of gravity and the spring disc 44 the core will be moved downwardly and will strike the head 26 to cause the valve 14 to be firmly seated.

The action described so far is similar to that in the previously mentioned applications of Willis H. Gille. The action of the manually operated valve actuating means of the valve will now be described. If for any reason there is a power failure, as is often the case, and it is desired to open the valve manually, knurled knob 53 is rotated so as to cause rotation of shaft 50 and rotation of pin 62 onto the curved surface 63 of the lever 64. As indicated in dotted lines in Figure 1, and as previously explained, this causes upward movement of the right-hand end of lever 64 causing the core to be moved upwardly so that the valve is raised. Due to the fact that in its valve open position, pin 62 is resting on a flat portion of lever 64 and the weight of the core is resting upon the right-hand end of lever 64, pin 62 will be held frictionally on the lever against the action of spring 57 which tends to return the same to the normal inoperative position.

As shown in Figure 5, the rotation of knurled knob 53 and shaft 50 in a manner to open the valve causes the disc 83 to be rotated away from engagement with the resilient switch blade 78 so as to allow engagement of contacts 79 and 80. The engagement of these contacts results in the establishment of an energizing circuit for coil 16 which is independent of the thermostat 85.

This circuit is traced as follows: From the right-hand end of secondary 94, through conductors 98 and 108, terminal 74, contact arm 77, contacts 79 and 80, switch blade 78, conductor 101, terminal 102, solenoid coil 16, conductor 103, terminal 73, and conductor 104 to the other terminal of the secondary 94. Since, as previously stated, the valve is operated when there is no power available, this circuit will not be effective to energize the coil until the power is restored. As soon as this happens, however, coil 16 will be energized causing the core to be lifted to its uppermost position and, as previously explained, releasing the pin 62 to permit the shaft 50 to rotate to its original position. In this position, the parts are so shown in the drawing and the manual operator is in no way interfering with the thermostatic control of coil 16. If, when the power is restored, the temperature is such that contacts 88 and 90 are in engagement the coil will remain energized and the valve will remain open. If, however, the temperature is such that contacts 88 and 90 are separated, the coil will be deenergized upon the return of shaft 50 to its original position by reason of the disc 83 moving against the contact arm 78 and causing separation of contacts 79 and 80. It will thus be seen that no matter what the position of the thermostat the valve will immediately return to automatic control upon the resumption of power.

It will be noted that the sealing means which I employ for shaft 50, which consists of the conical head 59 which is urged in the direction of the stud 51, is effective to seal the casing against the escape of any fluid, while at the same time permitting free rotation of the shaft 50. The spring 57 at the same time has a second function of urging the shaft to a valve closed position so that as soon as the coil 16 is energized the shaft will automatically return to the normal inoperative position. By reason of this seal it is possible to have the manual operator extend into the valve casing and cooperate with the core within the casing. Furthermore, by reason of the fact that shaft 50 extends parallel to the core 24, a very compact structure is produced which is free of any parts which project to any great extent from the casing.

It will be seen that I have provided a solenoid valve, with means for manually operating the same in the event of power failure, which is simple and compact in structure and which has provision for restoring the solenoid to the control of the thermostat or other condition responsive switch immediately upon the resumption of power regardless of the position of the thermostat. It will further be seen that I have provided a manual operator which extends into the valve chamber itself and operates directly upon the core of the solenoid, and in which means are provided for effectively sealing the casing at the point where the manual operator extends therethrough without interfering with the operation of said manual operator.

While I have shown a specific embodiment of my invention, it will be understood that this is for purposes of illustration only and that my invention is to be limited only by the scope of the appended claims.

I claim as my invention:

1. In combination, a device to be actuated, electromagnetic actuating mechanism therefor comprising a coil and a core movable within said coil, manually controlled means for operating said device comprising a manually rotatable shaft extending parallel to said core, and a lever extending between said shaft and said core, said lever and said shaft having cooperating portions such that rotation of said shaft causes movement of said lever such as to cause movement of said core.

2. In combination, a valve casing, a valve in said casing adapted to control the flow of fluid therethrough, electromagnetic actuating mechanism therefor comprising a coil having a passage connected to the interior of said casing and a core loosely mounted in the passage to permit circulation of fluid between the coil and core to absorb and carry away heat generated in the electromagnet, said core being associated with said valve to operate the same between open and closed positions, and means for manually operating said valve, said last named means comprising a manually rotatable shaft extending parallel to and substantially coextensively with said core and into said valve casing, and means in said casing cooperating with said shaft and said core such that rotation of said shaft causes movement of said core in valve opening direction.

3. In combination, a device to be actuated, electromagnetic actuating mechanism therefor comprising a coil and a core movable within said coil, manually controlled means for operating said device comprising a manually rotatable shaft extending parallel to said core, and a pivotally mounted lever having one end in engagement with said core and the other end adjacent one end of said shaft, said shaft and said lever having cooperating cam surfaces such that rotation of said shaft causes movement of said lever in a direction to move said core in the direction of its energized position.

4. In combination, a device to be actuated, electromagnetic actuating mechanism therefor comprising a coil and a core movable within said coil, manually controlled means for operating said device comprising a manually rotatable shaft extending parallel to and substantially coextensively with said core, and an operative connection between said shaft and said core effective upon rotation of said shaft to move said core in the direction of its energized position.

5. In combination, a device to be actuated, electromagnetic actuating mechanism therefor comprising a coil and a core movable within said coil, a casing partially enclosing said mechanism, a hollow block secured adjacent to the open portion of said casing and completing the enclosure of said mechanism, a manually rotatable member located at least partially in and projecting from said block, an operative connection between said member and said core effective upon rotation of said member to move said core in the direction of its energized position in the absence of electrical power, recycling contacts located in said block, means including said recycling contacts operative upon closure of said contacts and upon establishment of said power to cause energization of said coil, and means in said block operative upon rotation of said rotatable member to cause closure of said contacts.

6. In combination, a device to be actuated, electromagnetic actuating mechanism therefor comprising a coil and a core movable within said coil, a casing enclosing said mechanism, a hollow block secured to said casing, a manually rotatable member located at least partially in and projecting from said block, an operative connection between said member and said core effective upon rotation of said member to move said core in the direction of its energized position in the absence of electrical power, recycling contacts located in said block, means including said recycling contacts operative upon closure of said contacts and upon establishment of said power to cause energization of said coil, and means in said block operative upon rotation of said rotatable member to cause closure of said contacts.

7. In combination, a valve, electromagnetic actuating mechanism therefor comprising a coil and a core movable within said coil, a lost motion connection between said core and said valve whereby a hammer action is produced to firmly seat the valve in closing and to jar the valve loose from its seat in opening, manually operable means for actuating said valve in the event of power failure, said manually operable means being independent of the valve and directly engaging said core so as to operate said valve through said lost motion connection.

BENJAMIN CYR.